May 22, 1934.     F. A. BERG     1,959,654
AUTOMATIC SPACE AND CURRENT CONTROL FOR CARBON ARCS
Filed April 11, 1930
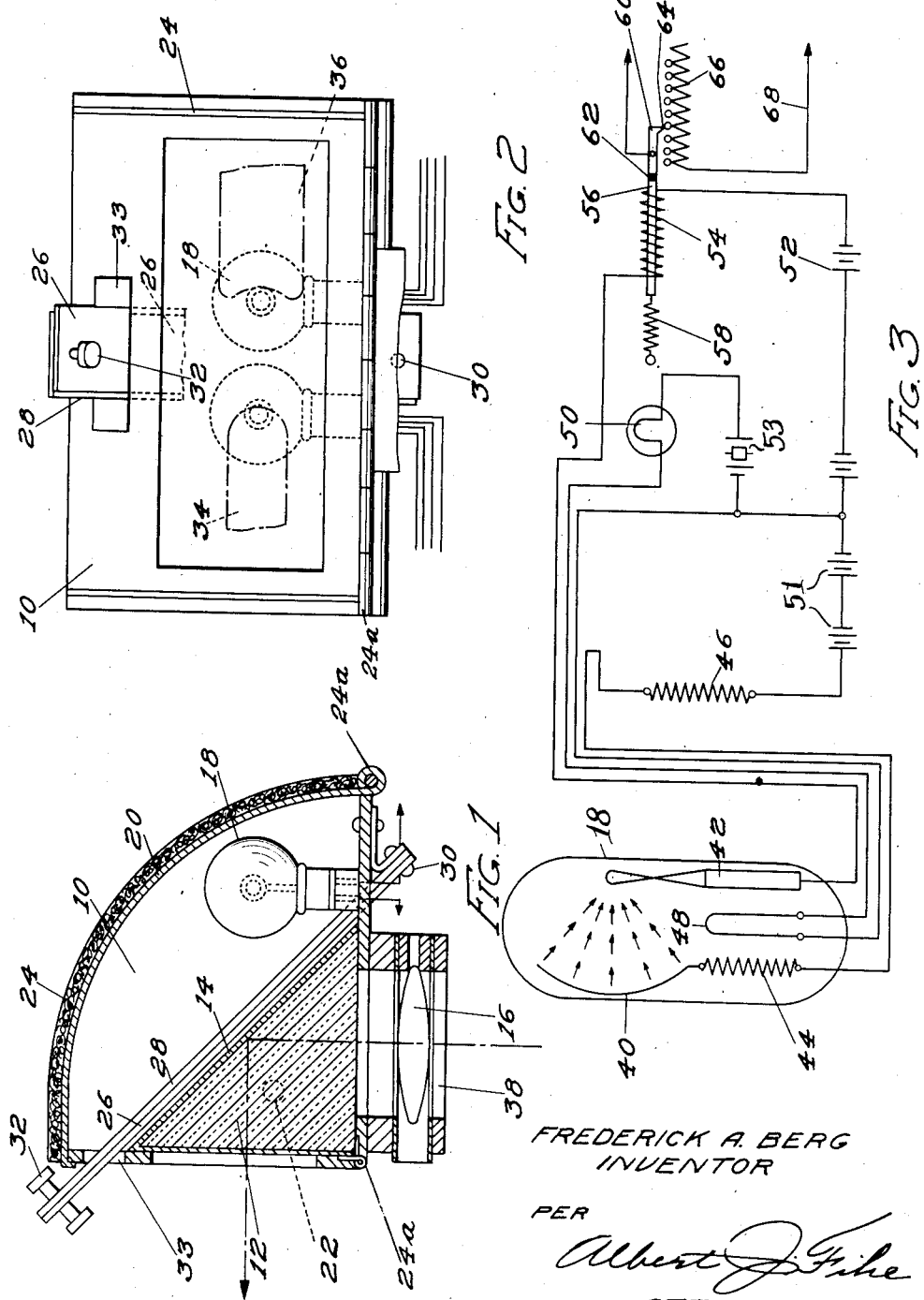
FREDERICK A. BERG
INVENTOR
PER
Albert J. Fihe
ATTORNEY Patented May 22, 1934

1,959,654

UNITED STATES PATENT OFFICE 1,959,654

AUTOMATIC SPACE AND CURRENT CONTROL FOR CARBON ARCS

Frederick A. Berg, Chicago, Ill.

Application April 11, 1930, Serial No. 443,393

6 Claims. (Cl. 176—74)

This invention relates to an improved automatic space and current control for carbon arcs, and is particularly adapted for use in connection with motion picture projection work or the like.

This application constitutes an auxiliary case to this same applicant's companion cases now pending on "Multiple high intensity projection lamp", Ser. No. 412,309, filed December 7, 1929, and "High intensity multiple automatic arc lamp", Ser. No. 425,440, filed February 3, 1930.

One of the important objects of this invention is to provide in connection with a source of light, such as a carbon arc or the like, a photo-electric cell or cells which are acted upon by the light in such a manner that variations in illumination will be automatically controlled and compensated for by the action of the photo-electric cells.

Another and still further important object of this invention is the provision of means in connection with a source of illumination such as carbon arcs or the like used in connection with motion picture projection work or the like, of means for automatically controlling and regulating the intensity of the light by photo-electric cells or similar devices whereby undesirable fluctuations will be eliminated.

Still another and further important object of the invention is the provision of means in connection with the peep-hole or reflecting prism for viewing an arc light or the like, for manually regulating the amount of illumination directed upon the automatic controlling elements, this means comprising adjustable opaque slides and also lenses for condensing or magnifying the image or diffusing the intensity of the rays of light as necessary or desirable.

Other and further important objects of the invention will be apparent from the disclosures in the accompanying drawing and following specification.

The invention, in a preferred form, is illustrated in the drawing and hereinafter more fully described.

In the drawing:

Figure 1 is a side elevation, partly in section of the improved automatic control of this invention.

Figure 2 is a front plan view of the device, parts being shown in dotted lines, and the reflection or image of other parts being indicated in dot and dash lines.

Figure 3 is a diagrammatic view illustrating the wiring arrangement of the apparatus.

As shown in the drawing:

The reference numeral 10 indicates generally a tiltable housing which incloses a reflecting prism 12, the prism having its angular face suitably coated as at 14 to provide a transparent mirror of silver nitrate or the like whereby light rays entering the bottom of the prism through the lens or the like 16 will be partially reflected outwardly to the eye of the observer and partially passed upwardly through the prism and fall upon a photo-electric cell or the like 18.

The housing itself includes a hinged curved cover 20 by means of which access may be had to the interior of the device and the entire apparatus is pivotally mounted on pivot pins connected at 22 whereby a tilting adjustment of the prism and its associated parts may be had with reference to the source of light and also with reference to the eye of the observer or operator.

The prism itself is suitably incased in a heat insulating frame or the like 24, hingedly mounted, and composed of asbestos or similar material, sufficient openings being, of course, provided for the passage of light into and out of the prism.

Directly behind the angular face of the prism is pivotally mounted a pair of manually adjustable opaque slides or the like 26 and 28, these slides being provided for movement about the pivot point 30 so that the amount of light passing through the lens 16, the prism 12 and the semi-transparent back 14 to the photo-electric cells 18 can be regulated by either closing the slides 26 and 28 upon each other as best illustrated in Figure 2 or by opening the same outwardly about the pivotal point 30 by a movement of the knobs 32; the plates projecting forwardly through a slot 33 in the housing 10, the slot being provided for this purpose.

As best illustrated in Figure 2, a pair of photo-electric cells is preferably provided each connected directly to a carbon control, one for the positive carbon, the image or reflection of which in the mirror is illustrated at 34, and another for the negative carbon, the image of which is illustrated in the dot and dash lines at 36. The distance between the carbons 34 and 36 depends to a considerable extent upon the amount of current flowing and also upon the particular apparatus with which the carbons are associated, the resultant light effect being also, of course, variable as the distance between the carbons and the amount of current passing through the arc.

Inasmuch as the photo-electric cells are extremely sensitive to light, only a very small amount of the light rays will be sufficient to affect the same so as to control the apparatus, and to this end, the slides 26 and 28 are provided so that if the carbons are separated to a considerable extent, the slides may be moved outwardly around the pivot point so as to manually regulate the amount of light striking the cells so as not to damage or paralyze the same.

Additionally, the light rays coming from the arc may be variably focused or condensed to a concentration point by means of the lens 16 or may be dispensed or diffused by means of some other lens which may be substituted in the place of the lens 16 by merely slidably removing the lens 16 from the socket provided therefor in the housing 38.

The amount of current flowing through the carbons 34 and 36 may be directly controlled by the operation of the photo-electric cell 18 or the distance between the carbons can be directly controlled by the photo-electric cells, this last control being effected by varying the current supplied to the automatic feed for the carbons which automatic feed constitutes an ordinary feature of the usual motion picture projection machine or other carbon arc light ordinarily in use.

In Figure 3 is illustrated a method by means of which the light falling upon a photo-electric cell will effect automatically through a current control, a carbon control or some other adjustment.

The photo-electrons are liberated by action of the light on the sensitive coating of the cell 18, the electrons then allowing current to pass to the plate 42 through the grid 44 and the resistance 46. The current to the filament 48 is controlled by an ordinary radio tube 50 acting through suitable batteries 51 or a rectifier 53 as indicated.

When the light intensity changes, the current flowing through the light sensitive cell changes and is amplified sufficiently by means of additional batteries 52, etc., so as to operate a relay or solenoid 54.

The solenoid or relay includes a movable arm 56 which is normally impelled into a rearward position by means of a spring 58, the outer end of the arm 60 being electrically insulated from the remainder thereof by means of a suitable block or the like 62, the arc itself having a contact member 64 which slides over a rheostat or the like 66 whereby current flowing through the wires 68 will be automatically regulated. These wires 68 can form part of the current flowing to the arc or may be part of a circuit which comprises the motors for the carbon feeds, or may constitute portions of some other circuit which can be used in any desirable way to control either the current flowing through the arc, the distance between the carbons or the feed of the carbons themselves. Any other factor which enters into the amount of light produced at the arc can also accordingly be automatically controlled, or cut in series with the arc controls.

It will be evident that herein is provided an automatic control for carbon arcs and the like, particularly those used in motion picture projection, which will be especially desirable as adapted to automatically compensate for fluctuations in the amount of light delivered which fluctuations result in annoyance to the spectators of the picture being produced and are sources of considerable trouble to operators.

I am aware that many changes may be made and numerous details of construction varied throughout a wide range without departing from the principles of this invention, and I, therefore, do not purpose limiting the patent granted hereon otherwise than as necessitated by the prior art.

I claim as my invention:

1. In combination with a carbon arc, an automatic current and space control, including light sensitive electric cells, and means controlled by the cells for varying the current at the arc, together with means for manually varying the amount of light falling upon the light sensitive cells, said means comprising a pair of pivoted slides between the light source and said cells.

2. In combination with a carbon arc, an automatic current and space control, including light sensitive electric cells, and means controlled by the cells for varying the current at the arc, together with means for manually varying the amount of light falling upon the light sensitive cells, said means comprising a reflecting prism and a set of interchangeable lenses adapted to be positioned between the light source and the cells.

3. In combination with a carbon arc, an automatic current and space control, including light sensitive electric cells, and means controlled by the cells for varying the current at the arc, together with means for manually varying the amount of light falling upon the light sensitive cells, said means comprising interchangeable lenses positioned between the source of light and the cells.

4. In combination with a carbon arc, an automatic current and space control, including light sensitive electric cells, and means controlled by the cells for varying the current at the arc, together with means for manually varying the amount of light falling upon the light sensitive cells, said means comprising a pair of pivoted slides, a set of interchangeable lenses adapted to be selectively positioned between the light source and the cells, and tiltable means for focusing the image for optical inspection.

5. In combination with a carbon arc, an automatic space and current control, and means for optically inspecting the arc, including a reflecting prism, photo-electric cells behind the prism, said photo-electric cells adapted to receive part of the light passing through the prism, means in connection with the cells for automatically regulating said light producing means, and tiltable means for focusing the image for optical inspection.

6. In combination with a carbon arc, an automatic space and current control, and means for optically inspecting the arc, including a reflecting prism, photo-electric cells behind the prism, said photo-eelctric cells adapted to receive part of the light passing through the prism means in connection with the cells for automatically regulating said light producing means, means for pivotally adjusting the prism and cell assembly with relation to the source of light, and tiltable means for focusing the image for optical inspection.

FREDERICK A. BERG.